United States Patent [19]

Hira et al.

[11] Patent Number: 4,473,662

[45] Date of Patent: Sep. 25, 1984

[54] CATALYST AND COMPOSITION FOR PRODUCING POLYURETHANE FOAM

[75] Inventors: Yasuo Hira, Fujisawa; Susumu Tsuzuku, Tokyo; Masao Gotoh, Yokosuka; Hitoshi Yokono, Katsuta, all of Japan

[73] Assignee: Hitachi, Ltd., Tokyo, Japan

[21] Appl. No.: 445,580

[22] Filed: Nov. 30, 1982

[30] Foreign Application Priority Data

Nov. 30, 1981 [JP] Japan ............................. 56-190743

[51] Int. Cl.³ .................... B01J 31/02; B01J 31/12
[52] U.S. Cl. .............................. 502/155; 502/167; 521/111
[58] Field of Search ............ 252/426, 431 C, 431 N; 556/413; 502/155, 167

[56] References Cited

U.S. PATENT DOCUMENTS 2,715,133  8/1955  Speier .................................. 556/413
3,706,687  12/1972  Rudzki ........................... 252/426 X

OTHER PUBLICATIONS

Noll, *Chemistry and Technology of Silicones,* Pub. by Academic Press (1968), pp. 174–179.

"J. of Applied Polymer Science", vol. IV, No. 11, pp. 207–211 (1960).

Saunders et al., *Polyurethanes Chemistry and Technology, Part I. Chemistry,* (1978) Pub. by R. E. Krieger Pub. Co., pp. 162–167, 200–203.

*Primary Examiner*—Patrick Garvin
*Attorney, Agent, or Firm*—Antonelli, Terry & Wands

[57] ABSTRACT

In a composition for producing polyurethane foam which comprises an organic polyisocynate compound, a compound having at least one active hydrogen atom in the molecule, a foaming agent and a catalyst as essential components, an aminoalkylsilane represented by the following general formula is contained:

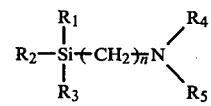

wherein n is 1 or 2, and $R_1$ to $R_5$ are alkyl groups.

By use of such a catalyst polyurethane foam having a even color distribution and excellent mechanical properties is produced.

8 Claims, No Drawings

CATALYST AND COMPOSITION FOR PRODUCING POLYURETHANE FOAM

BACKGROUND OF THE INVENTION

This invention relates to a catalyst for producing polyurethane foam and a composition for producing polyurethane foam containing such a catalyst.

Heretofore, (a) amine compounds, for example, triethylenediamine, 1,4-diazabicyclo(2,2,2)octane, N-methylmorpholine, N,N-dimethylethanolamine, N,N-dimethylcyclohexylamine, pentamethyldiethylenetriamine, 1,8-diazabicyclo(5,4,0)-undecene-7, N-methylpiperadine, etc. and (b) organic tin compounds, for example, dibutyl tin dilaurate, dibutyl tin diacetate, etc. are used as the catalyst for producing polyurethane foam [e.g. J. H. Saunders, K. C. Frisch: Polyurethanes, Chemistry and Technology, Part 1, Chemistry, pages 162–203, (1978), Robert E. Krieger Publishing Company, New York; Journal of Applied Polymer Science, Vol. IV, Issue No. 11, pages 207–211 (1960)].

Generally, polymethane foam can be obtained by mixing a liquid A comprising a compound containing at least one active hydrogen atom in a molecule, determined according to Zerewitinoff method (including water), a foaming agent, a catalyst, and, if necessary, a foam-controlling agent, with a liquid B comprising an organic polyisocyanate compound as the main component.

The conventional catalysts as mentioned above have a poor compatibility with the organic polyisocyanate compound, and no uniform foam can be obtained unless the liquids A and B are thoroughly mixed together at the production of polyurethane foam. That is, in the case of the conventional catalysts, reaction is locally promoted, if the mixing is not carried out thoroughly, and polyurethane foams having uneven color distribution at the inside are liable to be produced.

SUMMARY OF THE INVENTION

An object of the present invention is to provide polyurethane foam with an even color distribution and good mechanical properties free from the said disadvantages, which can be attained by using a novel catalyst having a good compatibility with an organic polyisocyanate compound and a composition containing such a catalyst.

The present inventors have made extensive studies of catalysts for promoting the urethanization reaction, which have a good compatibility with an organic polyisocyanate compound, and have found that an aminoalkylsilane compound represented by the following general formula (1) has a good compatibility with an organic polyisocyanate compound:

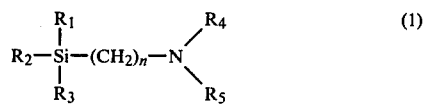

wherein n is 1 or 2, and $R_1$–$R_5$ are alkyl groups. The present invention is based on the foregoing finding.

The aminoalkylsilane compound for use in the present invention includes, for example, dimethylaminomethyltrimethylsilane, dimethylaminomethyltriethylsilane, diethylaminomethyltrimethylsilane, diethylaminomethyltriethylsilane, dimethylaminoethyltrimethylsilane, dimethylaminoethyltriethylsilane, diethylaminoethyltrimethylsilane, diethylaminoethyltriethylsilane, dibutylaminomethyltrimethylsilane, dibutylaminoethyltriethylsilane, etc., and preferably those having $R_1$ to $R_5$ of alkyl groups of $C_1$–$C_4$, more preferably those having $R_1$ to $R_5$ being alkyl groups of $C_1$–$C_2$, i.e. methyl and ethyl groups. They can be used alone or in mixture of at least two thereof.

The aminoalkylsilane can be obtained, for example, by heating a chloromethylsilane or a chloroethylsilane having the following formulae together with a secondary amine in an anhydrous solvent such as dioxane, etc. at 80°–150° C.

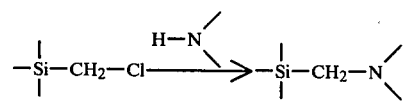

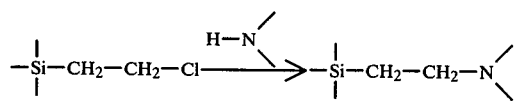

It has been found that the aminoalkylsilane has a good compatibility with an organic polyisocyanate compound, and can produce a polyurethane foam with a better uniform foam distribution when used as a catalyst than those obtained when the conventional catalysts are used. The reason why the present aminoalkylsilane catalyst has a good compatibility with an organic polyisocyanate compound seems to be that the molecule has an alkylsilane, but the detail has not been clarified yet.

The mixing ratio of the aminoalkylsilane catalyst is not particularly limited and can be changed in a broad range, but usually is 0.01 to 5.0 parts by weight, preferably 0.1 to 3 parts by weight per 100 parts by weight of the compound having at least one active hydrogen atom. A larger mixing ratio can be used, but this is not economical.

The present catalyst can be used together with the following so far known compounds having the catalytic activity. Such compounds include, for example, tertiary amine compounds such as triethylenediamine, dimethylethanolamine, morpholine compounds, imidazole compounds, 1,8-diazabicyclo(5,4,0)undecene-7, etc., and their Brønsted acid salts, and organic tin compounds such as dibutyl tin dibutyl tin dilaurate, dibutyl tin diacetate, etc., and can be used in a mixing ratio of the present aminoalkylsilane catalyst to the conventional catalyst compound of 1:4–4:1 by mole.

The compound having at least one active hydrogen atom in the molecule for use in the present invention works as a cross-linking agent and can be defined as compounds determined according to the method disclosed by Zerewitinoff in J. Am. Chem. Soc. 49 3181 (1927), and includes, for example, polyetherpolyols, polyesterpolyols, polyesterthioethers, polycarboxylic acids and water, among which the particularly important compounds are polyetherpolyols. Typical examples of polyetherpolyols include adducts of an alkylene oxide such as ethylene oxide, propylene oxide, and butylene oxide to a polyhydric alcohol such as glycerine, trimethylolpropane, triethanolamine, pentaerythrytol, bisphenol A, bisphenol F, sorbitol, sucrose, etc., and adducts of the alkylene oxide to ammonia and an amine compound such as monoethanolamine, diethanolamine, ethylenediamine, 4,4'-diaminodiphenylmethane, tolylenediamine, etc. They can be used alone or in mixture of at least two thereof.

The organic polyisocyanate compound for use in the present invention includes aliphatic polyisocyanates, alicyclic polyisocyanates, and aromatic polyisocyanates, among which the particularly important compounds are MDI (4,4'-diphenylmethane diisocyanate) compounds obtained by reacting a reaction product of aniline and formaldehyde with phosgen, and similar isocyanates, i.e. polyphenylenepolymethylpolyisocyanate, carbodiimidized MDI, etc. which are usually called "crude MDI", and further include xylylene diisocyanate, isophorone diisocyanate, tolylene diisocyanate, and prepolymers obtained therefrom. They can be used alone or mixture of at least two thereof. The mixing ratio of an organic polyisocyanate compound to a compound having at least one active hydrogen atom is 0.5 to 1.5, particularly 0.9 to 1.3 in terms of an isocyanate index as defined below:

$$\text{Isocyanate index} = \frac{\text{Number of isocyanate groups in polyisocyanate compound}}{\text{Number of active hydrogen atoms in compound having at least one active hydrogen compound}}$$

The foaming agent for use in the present invention includes water, low boiling liquid organic compounds including trichlorofluoromethane, methylene chloride, and n-heptane, and compounds capable of generating a nitrogen gas by decomposition such as azobisisobutyronitrile, etc.

Water has both actions as a cross-linking agent and a foaming agent, and when water is used as a compound having at least one active hydrogen atom, no foaming agent may be used. Among these foaming agents, low boiling halogenated hydrocarbons (boiling point: 0°–60° C.), for example, trichlorofluoromethane, have a low thermal conductivity and thus is a particularly important foaming agent for obtaining a product of high heat-insulating capacity. Foams with different densities can be obtained by changing the mixing ratio of the foaming agent. The foaming agent is used usually in an amount of 5 to 45 parts by weight to 100 parts by weight of a compound having at least one active hydrogen atom. The foaming agent can be used alone or in mixture of at least two thereof.

In the present invention, a foam-controlling agent can be used, if necessary, typical of which are oxyalkylene coplymers of polydimethylsiloxane and fluorine compounds. The foam-controlling agent is used in an amount of 0.5 to 3.0 parts by weight per 100 parts by weight of a compound having at least active hydrogen atom.

In production of polyurethane foam, a liquid A containing a compound having at least one active hydrogen atom in the molecule as the main component and a liquid B containing an organic polyisocyanate compound as the main component are mixed together. Generally, it is preferable to add a catalyst, a foaming agent, and a foam-controlling agent to the liquid A in advance. In addition, the following additives can be further used in the present invention: a filler, a pigment, a dye, a flame retardant, an ultraviolet ray absorbent, etc., which can be added to the liquid A or B in advance, or added to the mixture at the foam formation.

Mixing method for the liquids A and B is not particularly limited, and a high speed agitating machine, a foaming machine of impingement mixing type, etc. can be used. Foaming can be carried out in an appropriate open mold, or the mixture can be foamed in a closed mold to produce the so-called integral skin foam having skin layers of high density.

Whenever the novel catalyst of the present invention is used, a foam with an even color distribution can be obtained, as compared with the conventional catalyst.

PREFERRED EMBODIMENTS OF THE INVENTION

The present invention will be described in detail below referring to Examples and Comparative Examples showing the effect of the present invention.

Prior to description of Examples and Comparative Examples, solubility test results of the present catalyst and the conventional catalyst will be described below:

100 g of crude MDI was placed in a beaker, and 2 g of dimethylaminomethyltrimethylsilane of the present invention was added thereto. Then, the mixture was stirred for 5 seconds by a magnetic stirrer. 5 seconds after the start of stirring, dimethylaminomethyltrimethylsilane was completely dissolved.

In the same manner as above, diethylaminomethyltriethylsilane, dimethylaminoethyltrimethylsilane, diethylaminoethyltrimethylsilane, and di-t-butylaminomethyltrimethylsilane of the present invention were tested for the solubilities in carbodiimidized MDI, TDI, and crude MDI, and it was found that they could be all dissolved in the said organic polyisocyanate compounds 5 seconds after the start of stirring.

On the other hand, the conventional catalysts, triethylenediamine and dibutyl tin dilaurate, were likewise tested, but it was found that they could be dissolved in the said organic polyisocyanate compounds more than 15 seconds after the start of stirring.

Procedure for preparing the present catalysts and examples of producing polyurethane foam from the present compositions containing the present catalysts and comparative examples using the conventional catalysts will be described below, referring to Tables 1 and 2.

EXAMPLE 1

PREPARATION OF DIMETHYLAMINOMETHYLTRIMETHYLSILANE AS CATALYST

About 0.3 moles (37 g) of chloromethyltrimethylsilane in 200 ml of ethylether was placed in a 500-ml conical flask, and heated at 40° C. Then, about 0.5 moles (22.6 g) of dimethylamine in 100 ml of ethyl ether was added thereto dropwise at a rate of 5 ml/min. with stirring in a dry nitrogen gas stream. After the dropwise addition, the mixture was stirred for 2 hours to complete reaction. Then, 300 ml of distilled water was added thereto to transfer HCl and unreacted dimethylamine into an aqueous phase, and the aqueous phase was separated by means of a separating funnel. The foregoing procedure was repeated 5 times, and then 50 g of MgSO$_4$ was added to the organic phase to dry it. Then, MgSo$_4$ was removed by filtration, and the filtrate was placed into a rotary evaporator to remove ethylether, whereby about 40 g of dimethyltrimethylsilane was obtained as a colorless transparent liquid.

| Elemental analysis (% by weight): | | | |
|---|---|---|---|
| | C | H | N |
| Found | 76.8 | 6.8 | 5.7 |
| Calculated | 76.5 | 6.77 | 5.58 |

MOLDING OF POLYURETHANE FOAM

The composition shown under the column "Example 1" in Table 1, where the amounts of individual components are shown by parts by weight, that is, liquid A consisting of 40 parts by weight of propylene oxide (PO) adduct of monoethanolamine as a compound having at least one active hydrogen (OH value: 650 KOH mg/g), 60 parts by weight of PO adduct of 4,4'-diaminodiphenylmethane (OH value: 440 KOH mg/g), a foam-controlling agent, a foaming agent, and 1.5 parts by weight of dimethylaminomethyltrimethylsilane as prepared above, and liquid B consisting of 144 parts by weight of crude MDI (NCO content: 30.5% by weight) as an organic polyisocynate compound were used to mold polyurethane foam. Total 1449 g of liquids A and B having the said mixing ratios were placed in a 500-ml plastic container, stirred by a laboratory scale stirrer at 3000 rpm for 5 sec, and poured into a steel mold having a cavity (200×200×10 mm) at 40° C. Just after the pouring, a cover was placed on the mold to prepare a molding having the thickness of 10 mm and the density of 0.35 g/cm$^3$. The molding was a foam having skin layers having a high density, and tested for properties as shown in Table 2. The same liquids A and B were also subjected to free foaming to determine the reactivity. The results are shown under the column "Example 1" in Table 2.

Cream time (time till the start to foam) was 4 seconds, and rise time (time till the completion of foaming) was 43 seconds, and thus the reactivity was good. The molding having the said density and thickness was cut to pieces having a width of 20 mm and the lateral cross-sections were visually observed. It was found that foam cells were uniformly formed without any uneven color distribution.

Bending strength and Izod impact strength (with no notch) were as high as 180 kg/cm$^2$ and 12 kg·cm/cm$^2$, respectively.

EXAMPLES 2-8

PREPARATION OF AMINOALKYLSILANES AS CATALYSTS

In the same manners as in the preparation of dimethylaminomethyltrimethylsilane in Example 1, diethylaminomethyltriethylsilane (Example 3) was prepared by using about 0.3 moles (49 g) of chloromethyltriethyl silane in place of chloromethyltrimethylsilane; dimethylaminoethyltrimethylsilane (Examples 4, 7 and 8) by using about 0.3 moles (41 g) of chloroethyltrimethylsilane in place of chloromethyltrimethylsilane; diethylaminoethyltrimethylsilane (Example 5) by using about 0.3 moles (41 g) of chloroethyltrimethylsilane in place of chloromethyltrimethylsilane and about 0.5 moles (36.6 g) of diethylamine in place of dimethylamine; di-t-butylaminomethyltrimethylsilane (Example 6) by using about 0.5 moles (64.5 g) of di-t-butylamine in place of dimethylamine.

MOLDING OF POLYURETHANE FOAMS

Compositions shown under columns "Examples 2 to 8" in Table 1 were used to determine the reactivity, and also to prepare moldings of 200×200×10 mm to investigate the properties in the same manner as in Example 1, except that a molding having a density of 0.30 g/cm$^3$ was prepared from the molding amount of 120 g for Example 6, and moldings having a density of 0.4 g/cm$^3$ were prepared from the molding amount of 160 g for Examples 7 and 8. All the moldings were foams having skin layers with a high density. Properties of moldings prepared from the compositions of the individual Examples are shown under columns "Examples 2 to 8" in Table 2. Both cream time and rise time were short and thus the reactivity was excellent in all Examples. The moldings were foams with even distribution of foam cells and color at the inside and had both high bending strength and high Izod impact strength.

COMPARATIVE EXAMPLES 1, 2 AND 3

Compositions containing the conventional catalysts, shown under columns Comparative Examples 1 to 3 in Table 1 were used to determine the reactivity and also to prepare moldings of 200×200×10 mm to investigate the properties in the same manner as in Example 1, except that a molding having a density of 0.30 g/cm$^3$ was prepared from the molding amount of 120 g for Comparative Example 3. All the moldings were foams having skin layers with a high density. Properties of the moldings are shown under columns "Comparative Examples 1 to 3" in Table 2. The reactivity of Comparative Examples 1 to 3 were all inferior to that of Examples, and the moldings had an uneven distribution of foam cells, as compared with those of Examples, and also had white dots in Comparative Example 1, and uneven color distribution in Comparative Examples 2 and 3, and also were inferior in the bending strength and Izod impact strength to Examples, as is obvious from comparison of Comparative Example 1 with Examples 1, 3, 4 and 5 and from comparison of Comparative Example 3 with Example 6, where only catalyst species are different therebetween.

As described above, the present catalyst aminoalkylsilane has a good compatibility with an organic polyisocyanate compound in contrast to the conventional catalyst, and a polyurethane foam having a even distribution of foam cell and color and a better mechanical properties can be obtained from compositions containing the present catalyst than from the compositions containing the conventional catalyst.

The polyurethane foam obtained from the present composition has distinguished mechanical properties and equivalent heat insulation and dimensional stability to those of the conventional polyurethane foam, and thus the present composition is particularly suitable for producing polyurethane foam for heat-insulating material for refrigerators, and structural parts requiring lighter weight, higher heat insulation and higher mechanical strength.

TABLE 1

| Components | Compound | Example 1 | 2 | 3 | 4 | 5 | 6 | 7 | 8 | Comp. Example 1 | 2 | 3 |
|---|---|---|---|---|---|---|---|---|---|---|---|---|
| | | Liquid A | | | | | | | | | | |
| Compound having at least one active hydrogen atom | PO* adduct of nonoethanolamine (OH value: 650 KOH mg/g) | 40 | 40 | 40 | 40 | 40 | — | — | — | 40 | 40 | — |
| | PO* adduct of 4,4'-diaminodiphenylmethane (OH value: 440 KOH mg/g) | 60 | 60 | 60 | 60 | 60 | — | — | — | 60 | 60 | — |
| | PO* adduct of glycerine (OH value: 510 KOH mg/g) | — | — | — | — | — | 100 | 100 | 100 | — | — | 100 |
| Foam-controller | Oxyalkylene adduct of polydimethylsiloxane | 1 | 1 | 1 | 1 | 1 | 1 | 1 | 1 | 1 | 1 | 1 |
| Foaming agent | trichloromonofluoromethane | 20 | 20 | 20 | 20 | 20 | 30 | 10 | 10 | 20 | 20 | 30 |
| | Water | 0.5 | 0.5 | 0.5 | 0.5 | 0.5 | 0.25 | 0.5 | 1.5 | 0.5 | 0.5 | 0.25 |
| Catalyst the invention | dimethylaminomethyltrimethylsilane | 1.5 | 0.75 | — | — | — | — | — | — | — | — | — |
| | diethylaminomethyltriethylsilane | — | — | 1.5 | — | — | — | — | — | — | — | — |
| | dimethylaminoethyltrimethylsilane | — | — | — | 1.5 | — | — | 1.0 | 1.0 | — | — | — |
| | diethylaminoethyltrimethylsilane | — | — | — | — | 1.5 | — | — | — | — | — | — |
| | di-t-dibutylaminomethyltrimethylsilane | — | — | — | — | — | 1.5 | — | — | — | — | — |
| Prior art | triethylenediamine | — | — | — | — | — | — | 1.5 | — | 1.5 | 2.0 | 1.0 |
| | dibutyl tin dilaurate | — | — | — | — | — | — | — | 0.02 | — | — | 0.02 |
| | | Liq. B | | | | | | | | | | |
| Organic polyisocyanate compound | Crude MDI (NCO content: 30.5 wt %) | 144 | 144 | 144 | 144 | 144 | 138 | 145 | — | 144 | 144 | — |
| | Carbodiimidized MDI (carbodiimidization ratio: 20 wt %, NCO content: 30 wt %) | — | — | — | — | — | — | — | 45 | — | — | 45 |

*Propylene oxide
Unit: Parts by weight

TABLE 2

| Item | | Example 1 | 2 | 3 | 4 | 5 | 6 | 7 | 8 | Comp. Ex. 1 | 2 | 3 |
|---|---|---|---|---|---|---|---|---|---|---|---|---|
| Reactivity* | Cream time (sec.) | 4 | 4 | 4 | 4 | 4.5 | 4 | 4.5 | 5.0 | 5 | 6 | 5.5 |
| | Rise time (sec.) | 43 | 50 | 44 | 45 | 46 | 46 | 44 | 45 | 55 | 50 | 48 |
| Properties of molding | Density (g/cm$^3$) | 0.35 | 0.35 | 0.35 | 0.35 | 0.35 | 0.30 | 0.40 | 0.40 | 0.35 | 0.35 | 0.30 |
| | Uniformity of foam cells | Good | Good | Good | Good | Good | Good | Good | Good | Poor | Poor | Poor |
| | Uneven color distribution | None | None | None | None | None | None | None | None | White dots | Brown streaks | Brown streaks |
| | Bending strength (kg/cm$^2$) | 180 | 180 | 175 | 180 | 175 | 150 | 182 | 175 | 160 | 150 | 135 |
| | Izod impact strength (without notch) (kg · cm/cm$^2$) | 12 | 12 | 11.5 | 11.5 | 10.5 | 7.0 | 7.5 | 7.2 | 5.0 | 4.5 | 3.5 |

What is claimed is:

1. A catalyst for producing polyurethane foam, which comprises at least one aminoalkylsilane compound represented by the following general formula:

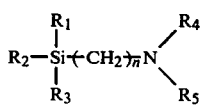

wherein n is 1 or 2, and $R_1$ to $R_5$ are alkyl groups and at least one of tertiary amine compounds, Brønsted acid salts thereof, and organic tin compounds as an additional catalyst component in a mixing ratio of the aminoalkylsilane compound to said additional catalyst component of 1:4–4:1 by mole.

2. The catalyst according to claim 1, wherein the aminoalkylsilane compound is at least one of dimethylaminomethyltrimethylsilane, dimethylaminomethyltriethylsilane, diethylaminomethyltrimethylsilane, diethylaminomethyltriethylsilane, dimethylaminoethyltrimethylsilane, dimethylaminoethyltriethylsilane, diethylaminoethyltrimethylsilane, diethylaminoethyltriethylsilane, dibutylaminomethyltrimethylsilane and dibutylaminoethyltriethylsilane.

3. The catalyst according to claim 1, wherein $R_1$ to $R_5$ of the aminoalkylsilane are methyl or ethyl groups.

4. A catalyst for producing polyurethane foam, which comprises
(a) at least one aminoalkylsilane compound represented by the following general formula:

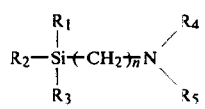

wherein n is 1 or 2, and $R_1$ to $R_5$ are alkyl groups of $C_1$–$C_4$;

(b) at least one of a tertiary amine compound, a morpholine compound, an imidazole compound, 1,8-diazabicyclo(5,4,0)undecene-7, a Brønsted acid salt thereof and an organic tin compound in a mixing ratio of the aminoalkylsilane compound (a) to the said additional compound (b) of 1:4–4:1 by mole.

5. The catalyst according to claim 4, wherein the aminoalkylsilane compound (a) is at least one of dimethylaminomethyltrimethylsilane, dimethylaminomethyltriethylsilane, diethylaminomethyltrimethylsilane, diethylaminomethyltriethylsilane, dimethylaminoethyltrimethylsilane, dimethylaminoethyltriethylsilane, diethylaminoethyltrimethylsilane, diethylaminoethyltriethylsilane, dibutylaminomethyltrimethylsilane and dibutylaminoethyltriethylsilane.

6. The catalyst according to claim 4, wherein $R_1$ to $R_5$ in the formula representing the aminoalkylsilane are methyl or ethyl groups.

7. The catalyst according to claim 4, wherein the tertiary amine compound is at least one of triethylenediamine and dimethylethanolamine.

8. The catalyst according to claim 4, wherein the organic tin compound is at least one of dibutyltin dilaurate and dibutyltin diacetate.

* * * * *